J. SCHWARTZMAN.
BED SPRING FABRIC.
APPLICATION FILED JUNE 6, 1917.
1,279,167.
Patented Sept. 17, 1918.
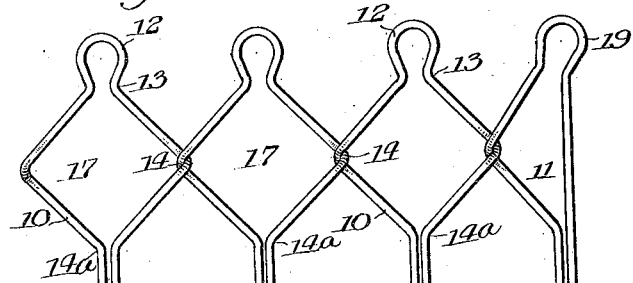
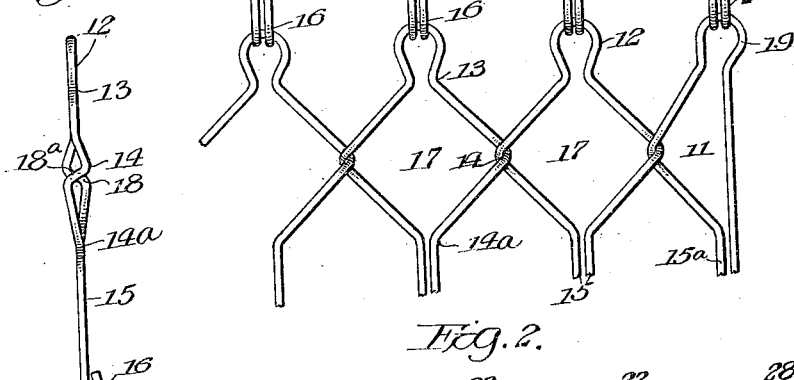
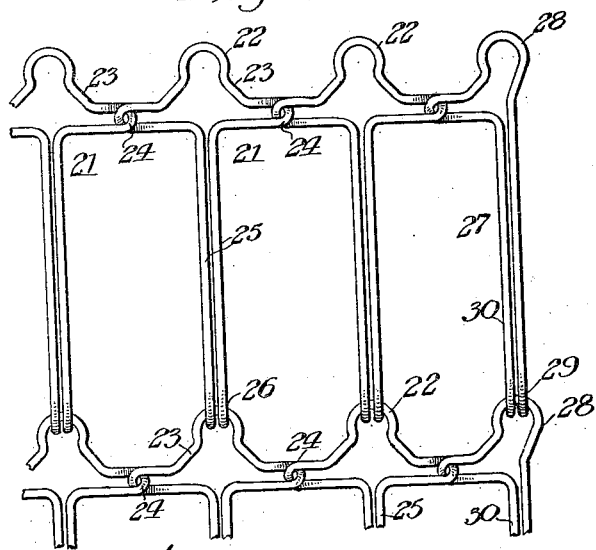
Inventor
Joszep Schwartzman
by Frank D Thomas Atty.

UNITED STATES PATENT OFFICE.

JOSZEP SCHWARTZMAN, OF CHICAGO, ILLINOIS.

BED-SPRING FABRIC.

1,279,167.

Specification of Letters Patent.  Patented Sept. 17, 1918.

Application filed June 6, 1917. Serial No. 173,214.

*To all whom it may concern:*

Be it known that I, JOSZEP SCHWARTZMAN, a subject of the King of Roumania, (having declared his intention of becoming a citizen of the United States,) residing at Chicago, in the county of Cook and State of Illinois, have invented new and useful Improvements in Bed-Spring Fabrics, of which the following is a full, clear, and exact description.

The invention relates to bed springs, and primarily to that type which is composed of a plurality of suitably shaped portions which are linked together at their sides and ends to produce the spring fabric.

The object of the invention is to produce a link whose design will permit a portion thereof to contract when a strain is applied lengthwise thereof, and which will again expand to its original shape when said strain is removed, resulting in a bed-spring having the desired spring comfort, and which will eliminate sagging thereof when the strain is removed. A further object is to produce a spring fabric in which the upper face thereof presents a substantially flat surface, eliminating to an appreciable extent the projections which are formed at the connection of one link with the other. It is also an object to produce these and other results in a simple expeditious manner without resulting in a corresponding reduction in efficiency.

I will explain the invention in conjunction with the accompanying drawings, in which—

Figure 1 is a plan view of a portion of a spring fabric composed of links embodying my invention;

Fig. 2 is a view, similar to Fig. 1, of a modified form of construction; and

Fig. 3 is a side elevation of one of the links shown in Fig. 1.

The embodiment of the invention shown in Fig. 1 is composed of a plurality of field links 10, 10, which are linked with each other at their sides and ends, and side or border rows of links 11, 11, to which the sides of the outermost rows of field links are connected when properly assembled. These links 11, 11, are connected with each other at top and bottom and vary somewhat in construction with respect to links 10. As all of links 10 and 11 correspond, respectively, in construction and contours with each other, an explanation of one of each of said links will suffice for an understanding of the remaining or similar ones.

Links 10 are each formed of a piece of suitable wire of the desired length, which is bent midway between its ends to form the eye 12. After said eye has been formed, the opposite branches of said wire are bent angularly outwardly and downwardly from the neck 13 of said eye for a suitable distance and then again bent inwardly from the vertex 14 at a right angle to the stretch of wire between said neck 13 and vertex. At a point 14$^a$ opposite eye 12 where the branches of the wire come together said branches are again bent into an angle so that the opposite end portions or shanks 15 of said wire are juxtaposed and extend parallel with each other a distance approximately one-half the length of the link and have their extremities bent to form the hooked ends 16 that are hooked over eye 12 of the link in line below it.

From the foregoing it can readily be seen that the portion between eye 12 and shanks 15 forms a substantially square or diamond-shaped frame 17 which will contract when a pulling strain is exerted upon the link and which will again expand to its original form after this strain has been released. By forming an angle in each leg of the link intermediate its ends, as indicated at 13 and 14$^a$ in Fig. 1 and illustrated in Fig. 2, I provide spring action in the fabric through the opening of said angles under the weight of a person on the bed and their contraction when the weight is removed. While I have explained and illustrated a construction which results in a substantially square opening 17, it is very evident that the same advantageous result can be attained by varying the particular contour of this portion.

Each row of links is connected to an adjacent row by a connection at 14, which is particularly designed at this point to reduce to a minimum any projections which would militate against presenting a substantially flat face to said spring fabric. The particular construction resorted to at this point, besides lending itself to the last-named advantage, also produces a convenient arrangement whereby the several links are held against relative endwise movement or slippage when a pulling strain is exerted upon them.

By referring to Fig. 3, it can readily be seen that the portions of said wire at points 14 are bent or offset away from each other slightly and produce the shoulder 18. The connecting collateral link is provided with a similar construction to provide a shoulder 18ª which opposes the shoulder of said first-mentioned link so that said links will, when connected together, as shown in Fig. 1, be prevented from moving in an endwise direction relative to each other.

Links 11 forming the side edge or border of said bed-spring are also produced from a single piece of wire bent at a suitable point between its ends to provide an eye 19 and to provide a link one side of which corresponds in shape and construction to one-half of link 10 and the other side of which consists of a straight downward stretch of wire the lower half of which parallels the shank 15ª of the other half of said link and terminates in a hook 20 similar to that of said shank 15ª.

In the modified structure illustrated in Fig. 2, the wire forming the link 21 is also bent to form an eye 22, and also has a portion of each end bent outwardly and downwardly from the eye, as indicated at 23, where said wire is bent at an obtuse angle to portion 23 and extended outwardly a suitable distance and then bent back upon itself at 24 to a point in substantial alinement with the center of eye 22 where both ends are bent at right angles to form the shanks 25, which latter extend parallel with and in close proximity to each other for the greater portion of the length of the link, and have their lower ends terminating in the hooks 26 that engage eye 22 of the link below it.

The links 27 forming the side edges of this modified form of bed-spring are also produced of a single piece of wire bent intermediate its ends to provide the eye 28. One side of this link corresponds in shape and construction with one-half of one of links 21, and the other side thereof consists of a straight downward stretch of wire which parallels the long shank 30 of the link and terminates in a hook 29 similar to that of said shank to enable it to be attached to the link below it. The portion at the bend of this modification will also be offset in the same manner, as shown in Figs. 1 and 3, and the links, when formed in this manner will connect with each other at their sides at this point.

While I have herein shown and described various forms which the invention is susceptible of assuming, it is obvious that changes and modifications may still be resorted to without departing from the spirit of the invention.

What I claim as new is:—

1. A link for bed spring fabrics, comprising a wire shaped into an open figure for attachment at four spaced points to other links, said wire being bent to form an angle between each adjacent pair of said attaching points, whereby the expansion and contraction of said angles provide spring action in the fabric.

2. A link for bed spring fabrics, comprising a wire shaped into an open figure for attachment at four spaced points to other links, said wire being bent to form a single angle only between each adjacent pair of said attaching points, whereby the expansion and contraction of said angle provides spring action in said fabric.

3. A link for bed spring fabrics, comprising a wire shaped into an open figure for attachment at four spaced points to other links, said wire being bent inwardly to form an angle between each adjacent pair of said attaching points, whereby the expansion and contraction of said angles provides spring action in said fabric.

4. A link for bed spring fabrics, comprising a wire shaped into an open four-sided figure for attachment at four spaced points to other links, each of the four sides of the link being bent inwardly to form an angle between each adjacent pair of said attaching points, two of said sides being juxtaposed and paralleling each other for a portion of their length, whereby the expansion and contraction of said angles provides spring action in said fabric.

5. A link for bed spring fabrics, comprising a wire shaped into an open figure for attachment at spaced points to other links, said wire being bent inwardly of the figure to form an angle between adjacent attaching points and two adjacent legs of the figure being juxtaposed and paralleling each other for a portion of the length of the link, whereby the expansion and contraction of said angles provides spring action in said fabric.

In witness whereof I have hereunto set my hand this 4th day of June, 1917.

JOSZEP SCHWARTZMAN.

Witnesses:
 FRANK D. THOMASON,
 FLORENCE MITCHELL.